(12) United States Patent
Bansal et al.

(10) Patent No.: US 8,135,787 B2
(45) Date of Patent: Mar. 13, 2012

(54) INSTANT MESSAGING MONITORING AND ALERTS

(75) Inventors: Ravi P. Bansal, Tampa, FL (US); Brian M. O'Connell, Cary, NC (US); Esteban Poll, Lake Worth, FL (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 12/485,470

(22) Filed: Jun. 16, 2009

(65) Prior Publication Data

US 2010/0318620 A1 Dec. 16, 2010

(51) Int. Cl.
*G06F 15/16* (2006.01)
(52) U.S. Cl. ......... 709/206; 709/204; 709/229; 715/758
(58) Field of Classification Search .................. 709/206, 709/229, 204, 217; 715/758, 753
See application file for complete search history.

(56) References Cited

U.S. PATENT DOCUMENTS

| | | | | |
|---|---|---|---|---|
| 6,104,989 | A * | 8/2000 | Kanevsky et al. | 704/9 |
| 6,393,460 | B1 * | 5/2002 | Gruen et al. | 709/204 |
| 6,557,027 | B1 * | 4/2003 | Cragun | 709/219 |
| 7,200,635 | B2 * | 4/2007 | Yashchin et al. | 709/206 |
| 7,725,538 | B2 * | 5/2010 | Kirkland et al. | 709/204 |
| 2003/0105827 | A1 | 6/2003 | Tan et al. | |
| 2004/0083101 | A1 | 4/2004 | Brown et al. | |
| 2005/0262199 | A1 * | 11/2005 | Chen et al. | 709/206 |
| 2006/0090137 | A1 | 4/2006 | Cheng et al. | |
| 2007/0016641 | A1 * | 1/2007 | Broomhall | 709/206 |
| 2007/0198645 | A1 | 8/2007 | Chen et al. | |
| 2007/0250581 | A1 | 10/2007 | Patel et al. | |
| 2007/0255791 | A1 * | 11/2007 | Bodlaender et al. | 709/206 |
| 2008/0115068 | A1 * | 5/2008 | Smith | 715/758 |
| 2008/0307061 | A1 * | 12/2008 | Jacovi et al. | 709/206 |
| 2009/0094536 | A1 * | 4/2009 | Keohane et al. | 715/758 |
| 2009/0100184 | A1 * | 4/2009 | Chakra et al. | 709/229 |
| 2009/0319915 | A1 * | 12/2009 | Bates et al. | 715/753 |
| 2010/0175003 | A1 * | 7/2010 | Castellucci | 715/758 |
| 2010/0180217 | A1 * | 7/2010 | Li | 715/758 |
| 2010/0315435 | A1 * | 12/2010 | Ishida et al. | 345/634 |
| 2010/0318620 | A1 * | 12/2010 | Bansal et al. | 709/206 |

* cited by examiner

*Primary Examiner* — Ramy M Osman
(74) *Attorney, Agent, or Firm* — Yudell Isidore Ng Russell PLLC (57) ABSTRACT

Systems, methods, and articles of manufacture embodied as computer program products for facilitating the avoiding of sending a message to an unintended recipient. In some embodiments of the invention, in an instant messaging (IM) environment, the relatedness of a first entry in a first IM session to previous entries in the first IM session is determined. In response to the entry not meeting a first pre-determined relatedness threshold, an alert is issued. In one embodiment, the relatedness of the first entry to previous entries in a second IM session is determined, in response to the entry meeting a second pre-determined relatedness threshold, an alert is issued. In one implementation, relatedness is determined based on a matching of keywords between the first entry and the previous entries. In another implementation, relatedness is determined based on a matching of topics associated with one or more IM sessions, which topics can be associated with keywords.

20 Claims, 6 Drawing Sheets

| TOPIC | KEYWORDS |
|---|---|
| TENNIS | TENNIS PLAYER A<br>WIMBLENDON<br>US OPEN<br>TENNIS PLAYER B<br>CLAY COURT |
| POLITICS | OFFICIAL A<br>OFFICIAL B<br>OFFICIAL C<br>FILIBUSTER<br>SENATE |
| BUDGET | BUDGET<br>FINANCIALS<br>FORECAST |
| WEATHER | WEATHER<br>CLOUDY<br>TEMPERATURE<br>FORECAST |

502 — TOPIC column
504 — KEYWORDS column

INSTANT MESSAGING MONITORING AND ALERTS

BACKGROUND

1. Technical Field

Embodiments of the invention disclosed generally relate to data processing systems and associated methods for processing and displaying messages. In particular, embodiments of the invention relate to methods, data processing systems, and computer program products for processing near real-time or real time messages over a communications network.

2. Description of the Related Art

The use of communications networks to send and receive messages is common. For example, the well-known e-mail has become an ubiquitous messaging technology. Instant messaging (IM) is another messaging technology which facilitates near real-time communication over a network. IM applications typically include features such as immediate receipt of acknowledgment or reply, group sessions, conference services (including voice and video), session logging, quick exchange of information (like Universal Resource Locators (URLs) or a segment of a document), and file transfer.

Users of instant messaging often maintain multiple IM sessions simultaneously. For example, users may have ten or more IM sessions ongoing at the same time. A user may have IM sessions both in one-on-one and group contexts. Separate IM sessions are presented via respective IM windows. The use of multiple, simultaneous IM sessions might lead to undesired outcomes such as when user A enters a message intended for user B in the IM window having the IM session with user C. This may occur, for example, when user A has multiple IM windows open and mistakenly selects the wrong IM window. User A may enter a message into the unintended IM window without looking at the recipient's name, resulting in the message being inadvertently sent to the wrong recipient.

In another example, user A might have multiple IM windows open with user B, such as via a universal chat client like Trillian™ or Pidgin. For example, one IM session is opened with user B via a work service IM provider, while another IM session is opened with user B via a personal IM service provider. From all or most appearances, the two IM windows supporting the respective IM sessions may appear identical, and therefore, user A may inadvertently send messages pertaining to work over the personal IM service provider and, conversely, send messages related to personal matters over the work IM service provider. Forwarding communications to an unintended recipient might produce unwanted results—such as sending confidential data over an unsecured public system, or sending inappropriate private, personal messages over a work system.

With IM becoming an important part of both personal and business communications, there exists an ongoing need and desire to enhance the functionality and usability of this type of communication tool.

SUMMARY OF ILLUSTRATIVE EMBODIMENTS

Disclosed are systems, methods, and articles of manufacture embodied as computer program products for facilitating the avoiding of sending a message to an unintended recipient. In some embodiments of the invention, in an instant messaging (IM) environment, the relatedness of a first entry in a first IM session to previous entries in the first IM session is determined. In response to the first entry not meeting a first pre-determined relatedness threshold, an alert is issued. In one embodiment, the relatedness of the first entry to previous entries in a second IM session is determined, and in response to the entry meeting a second pre-determined relatedness threshold, an alert is issued. In one implementation, relatedness is determined based on a matching of keywords between the first entry and the previous entries. In another implementation, relatedness is determined based on a matching of topics associated with one or more IM sessions, which topics can be associated with keywords.

In one aspect the invention is a method of monitoring messages in a communications network to facilitate avoiding the sending of a communication to an unintended recipient. The method involves receiving a first entry in a first instant messaging (IM) window, identifying first keywords associated with the first entry, and storing the first keywords. The method also includes receiving a second entry in the first IM window, identifying second keywords in the second entry, and storing the second keywords. The method additionally involves determining via a keyword match and warning module (KMWM) whether the first keywords meet a predetermined comparison threshold against the second keywords. The method can also involve issuing a warning via the KMWM in response to determining that the comparison threshold is not met. In some embodiments, the method also includes requesting a confirmation that the second entry should be sent to the recipient associated with the first window.

In one implementation the invention is a method of monitoring messages in a communications network for issuing an alert when a request is made to forward a communication to an apparently unintended recipient. The method involves receiving a first entry in a first IM window, identifying first keywords associated with the first entry, and storing the first keywords. The method also includes receiving a second entry in a second IM window, identifying second keywords in the second entry, and storing the second keywords. The method also includes receiving a third entry in the first IM window, identifying third keywords in the third entry, and storing the third keywords. The method additionally involves determining via a keyword match and warning module (KMWM) whether the first keywords meet a predetermined comparison threshold against the third keywords. In response to determining that the third keywords meet the predetermined comparison threshold, the third entry is forwarded to a recipient associated with the first window. In response, to determining that the third keywords do not meet the predetermined comparison threshold, the KMWM determines whether the third keywords meet a second predetermined comparison threshold against the second keywords. In the negative case, the third entry is forwarded to the recipient associated with the first window. In the affirmative case, the KMWM issues a warning. In some embodiments, the method also includes requesting a confirmation that the third entry should be sent to the recipient associated with the second window.

In yet another aspect, the invention is directed to a method of monitoring messages in a communications network to facilitate avoiding the sending of a communication to an unintended recipient. The method includes identifying, via a topic recognition engine, first and second topics associated with respective first and second instant messaging (IM) sessions. The method further involves receiving a first message in the first IM session and determining whether the first message is associated with a first pre-defined topic. The method also includes, in response to determining that the first message is associated with a first pre-defined topic, determining whether the first pre-defined topic matches a topic identified as associated with the first IM session. The method additionally involves, in response to determining that the first pre-defined topic does not match a topic identified as associated with the first IM session, determining whether the first pre-defined topic matches a topic identified as associated with the second IM session. The method further includes, in response to determining that the first-predefined topic matches a topic identified as associated with the second IM session, issuing a confirmation request as to whether the first message should be sent to the recipient associated with the first IM session.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF ILLUSTRATIVE EMBODIMENTS

Disclosed are systems, methods, and articles of manufacture embodied as computer program products for facilitating the avoiding of sending a message to an unintended recipient. In some embodiments of the invention, in an instant messaging (IM) environment, the relatedness of a first entry in a first IM session to previous entries in the first IM session is determined. In response to the entry not meeting a first pre-determined relatedness threshold, an alert is issued. In one embodiment, the relatedness of the first entry to previous entries in a second IM session is determined, in response to the entry meeting a second predetermined relatedness threshold, an alert is issued. In one implementation, relatedness is determined based on a matching of keywords between the first entry and the previous entries. In another implementation, relatedness is determined based on a matching of topics associated with one or more IM sessions, which topics can be associated with keywords.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention. It is understood that the use of specific component, device and/or parameter names are exemplary only and not meant to imply any limitations on the invention. The invention may thus be implemented with different nomenclature or terminology used to describe the components, devices, or parameters herein, without limitation. Each term used herein is to be given its broadest interpretation given the context in which that terms is used.

As used here, the phrase "primary user" is synonymous with "user", unless otherwise explicitly specified. The use of "primary" to modify "user" is merely for convenience and clarity of description; hence, "primary" in relation to "user" is not to be given any meaning beyond being a generic descriptor such as, "first", "second", "user A", "user X", etc. As used here, the terms "client" and "user" can be interchangeable depending on the context in which those terms are employed. As used here, the phrase "relevance of a message" indicates a degree of relatedness between separate entries or messages. "Relatedness" is used to indicate a given, quantifiable quality of matching between a first set of keywords (or a single keyword) and a second set of keywords (or a single keyword). Relatedness also can refer to a quality of matching between one topic and another topic. The term "topic" refers to a named grouping of related words. For example, "Baseball Team A," "Baseball Player A," and "home run" may be assigned to the topic "Baseball." The term "context" refers to a group of associated topics. An IM session involving various topics has a context defined by those topics. As used here, the term "entry" refers to a data input into an IM session, which data input can be text, audio, video, etc. In some specific embodiments, an entry refers to a line of text entered in an IM session for delivery to a recipient associated with the IM session.

As used here, the term "window" refers to a commonly known graphical user interface feature typically used with data processing systems; more specifically, unless otherwise specified, "window" refers herein to a graphical user interface that facilitates display of messages. Often an IM session will have its own corresponding IM window. The term "window" includes what is commonly known as a chat window. In the context of an instant messaging environment an IM window can refer to an IM session, and an IM window can support multiple, simultaneous, and separate IM sessions.

Figure 1:
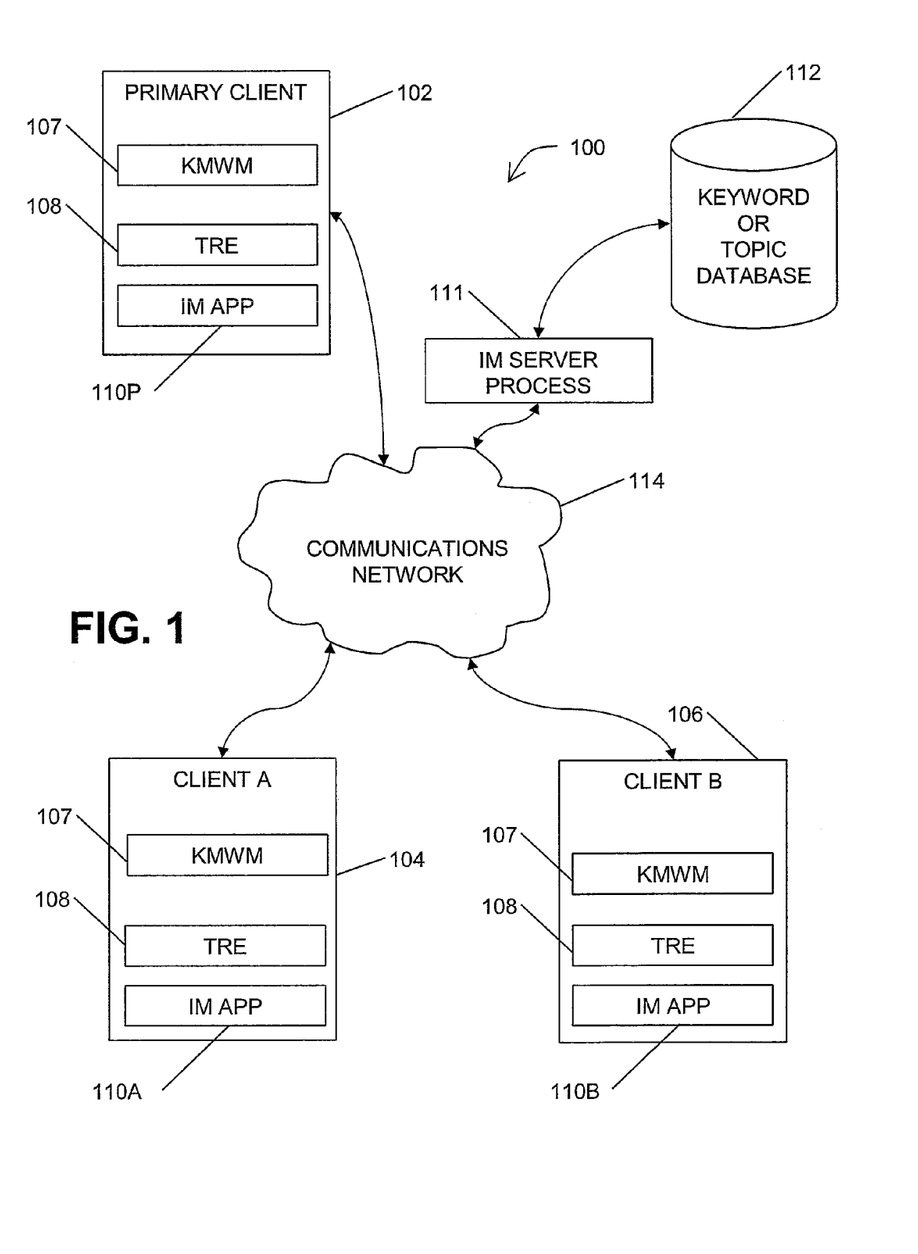
FIG. 1 is a high level schematic diagram of a networked computing environment configured with hardware and software components for implementing embodiments of the invention.

Referencing FIG. 1 now, networked computing environment 100, in which embodiments of the invention can be implemented, includes primary client 102, client A 104, and Client B 106 in communication between and/or among each other via communications network 114. In some embodiments, IM server process 111 is provided to facilitate the exchange of messages between and/or among primary client 102, client A 104, and client B 106. In some implementations, keyword or topic database 112 can be coupled to IM server process 111 to provide services to one or more of primary client 102, client A 104, and client B 106, as will be further described below. IM server process 111 and keyword or topic data base 112 can be located on a server computer (not shown), for example, connected to communications network 114. Communications network 114 can be a one or more cooperating networks of computers, telephone signals switching stations, satellite links, cellular phone towers, etc., configured to receive, transmit, and deliver data signals between and/or among primary client 102, client A 104, and Client B 106. In one embodiment, communications network 114 is the Internet, which is a worldwide collection of networks and gateways that utilize the Transmission Control Protocol/Internet Protocol (TCP/IP) suite of protocols to communicate with one another. In other embodiments, communications network 114 can be a virtual private network, an intranet, a local area network, a wide area network, etc. The depicted and discussed examples are not meant to imply any specific architectural or network limitations with respect to the present invention.

Primary client 102, client A 104, and Client B 106 can be any computing devices capable of transmitting and receiving communication signals. In a preferred embodiment, primary client 102, client A 104, and Client B 106 are personal computing devices such as laptops, desktops, etc. In one embodiment, primary client 102 is a computing device such as data processing system 200 illustrated in FIG. 2. In other embodiments, primary client 102, client A 104, and/or Client B 106 can be a mobile telephone, cellular phone, radio phone, personal digital assistant, smart phone, etc. Preferably, at least one of primary client 102, client A 104, and Client B 106 includes Keyword Match and Warning Module ("KMWM") 107, Topic Relevance Engine ("TRE") 108, and instant messaging (IM) client 110, which will be described further below. IM client 110 processes messages received from users located on remote data processing systems, such as messages between client A 104 and client B 106, for example. As messages are received, IM client 110 presents the messages in a dialog window (or IM window). Additionally, an IM window typically provides an interface to receive entries which IM client 110 sends to other clients.

In one implementation, primary client 102 receives entries via IM client 110P for delivery and display in near real-time at client A 104 and/or Client B 106. As further described below, in some embodiments, KMWM 107 and/or TRE 108 can be configured to cooperate with keyword or topic database 112 to identify instances in which a current entry in an IM session appears to be unrelated to previous entries in the same IM session, thereby indicating that a message is about to be sent to an unintended recipient. Hence, KMWM 107 and/or TRE 108 are configured to monitor input into PA client application 110P to request verification before sending an entry to Client B 106 when the entry appears to be unrelated to previous entries forwarded to Client B 106.

Figure 2:
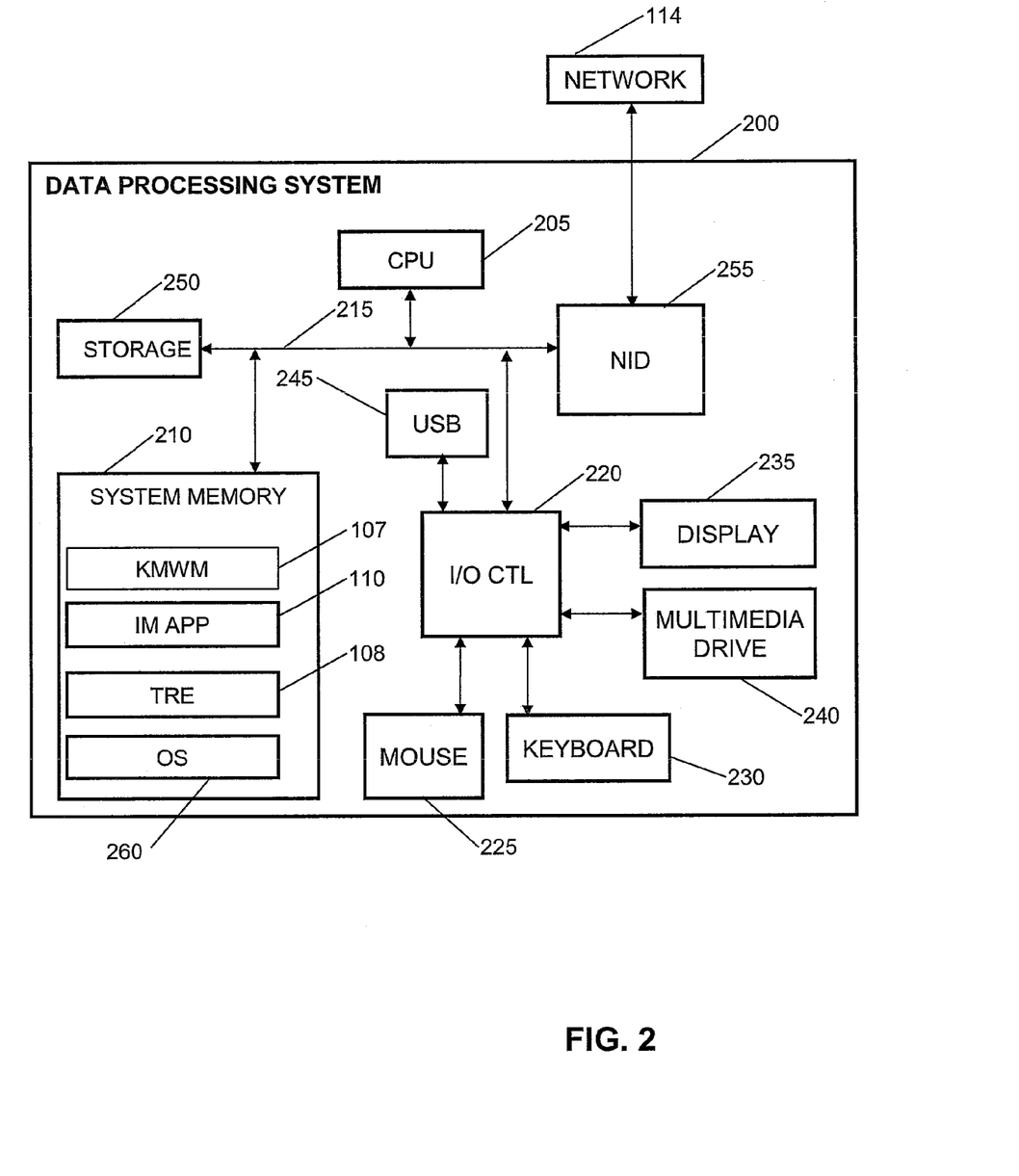
FIG. 2 is a block, schematic diagram of a data processing system that can be used in the network computing environment of FIG. 1.

Turning to FIG. 2, a block diagram of data processing system 200 is depicted. Data processing system 200 is an exemplary computing device that can be used as primary client 102, client A 104, or Client B 106. In one embodiment, data processing system 200 includes at least one processor or central processing unit (CPU) 205 connected to system memory 210 via system interconnect/bus 215. System memory 210 is a lowest level of memory, and may include, for example, DRAM, flash memory, or the like. Of course, data processing system 200 may include additional volatile memory, including, but not limited to, cache memory, registers, and buffers. Also connected to system bus 215 is I/O controller 220, which provides connectivity and control for input devices, of which pointing device (or mouse) 225 and keyboard 230 are illustrated, and output devices, of which display 235 is illustrated. Additionally, a multimedia drive 240 (for example, CDRW or DVD drive) and USB (universal serial bus) hub 245 are illustrated, coupled to I/O controller 220. Multimedia drive 240 and USB hub 245 may operate as both input and output (storage) mechanisms. Data processing system 200 also comprises storage 250, within which data, instructions, or code may be stored. Network interface device (NID) 255 can be coupled to system bus 215. NID 255 enables data processing system 200 to connect to one or more access networks, such as communications network 114.

Notably, in addition to the above described hardware components of data processing system 200, various features can be completed via software (or firmware) code or logic stored in system memory 210 or other data storage (for example, storage 250) and executed by CPU 205. In one embodiment, data, instructions, and/or code from storage 250 populates the system memory 210, which is also coupled to system bus 215. Thus, system memory 210 can include software or firmware components, such as operating system (OS) 260 (for example, Microsoft Windows®, GNU®, Linux®, or Advanced Interactive eXecutive (AIX®)), KMWM 107, TRE 108, and IM client 110.

In actual implementation, KMWM 107 and/or TRE 108 and IP client 110 may be combined as a single application collectively providing the various functions of each individual software component when CPU 205 executes the corresponding code. For simplicity, KMWM 107 and/or TRE 108 and IM client 110 are illustrated and described as stand alone or separate software/firmware components, which are stored in system memory 210 to provide or support the specific novel functions described herein. In some embodiments, however, components or code of OS 260 may be combined with that of KMWM 107 and/or TRE 108 and/or IM client 110, collectively providing the various functional features of the invention when CPU 205 executes the corresponding code.

In certain embodiments, CPU 205 executes KMWM 107 and/or TRE 108, IM client 110, and OS 260, which supports the user interface features of KMWM 107 and/or TRE 108 and IM client 110. In some embodiments, IM client 110 provides several graphical user interfaces (GUI) to enable user interaction with, or manipulation of, the functional features of IM client 110. Depending on the specifics of any given configuration, each of primary client 102, client A 104, and Client B 106 can be provided with a general computing architecture based on data processing system 200. However, the hardware and/or software functionality comprised by primary client 102, client A 104, and Client B 106 can be customized for the specific user, use, or environment.

As will be described below, in one embodiment KMWM 107 and/or TRE 108 monitor communication between and/or among primary client 102, client A 104, and Client B 106 in the networked environment 100 shown in FIG. 1. Among exemplary software code or instructions provided by KMWM 107 and/or TRE 108 and IM client application 110 are computer program code for: (a) receiving entries; (b) parsing the entries to identify keywords or topics; (c) determining whether a keyword matching threshold is met or whether a there is topic conflict; and (d) issuing a notification in response to determining that a keyword match threshold has been met or that a topic conflict exists. Depending on the specific embodiment, KMWM 107 and/or TRE 108 and IM client 110 can include some or all of the listed code functions (a)-(d). Additionally, KMWM 107 and/or TRE 108 and IM client 110 can include program code for other messaging processing functionality further discussed below. According to the illustrative embodiment, when CPU 205 executes KMWM 107 and/or TRE 108 and IM client 110, data processing system 200 initiates a series of processes that enable the above functional features as well as additional features or functionality, which are described below within the description of FIGS. 3-6.

Figure 3:
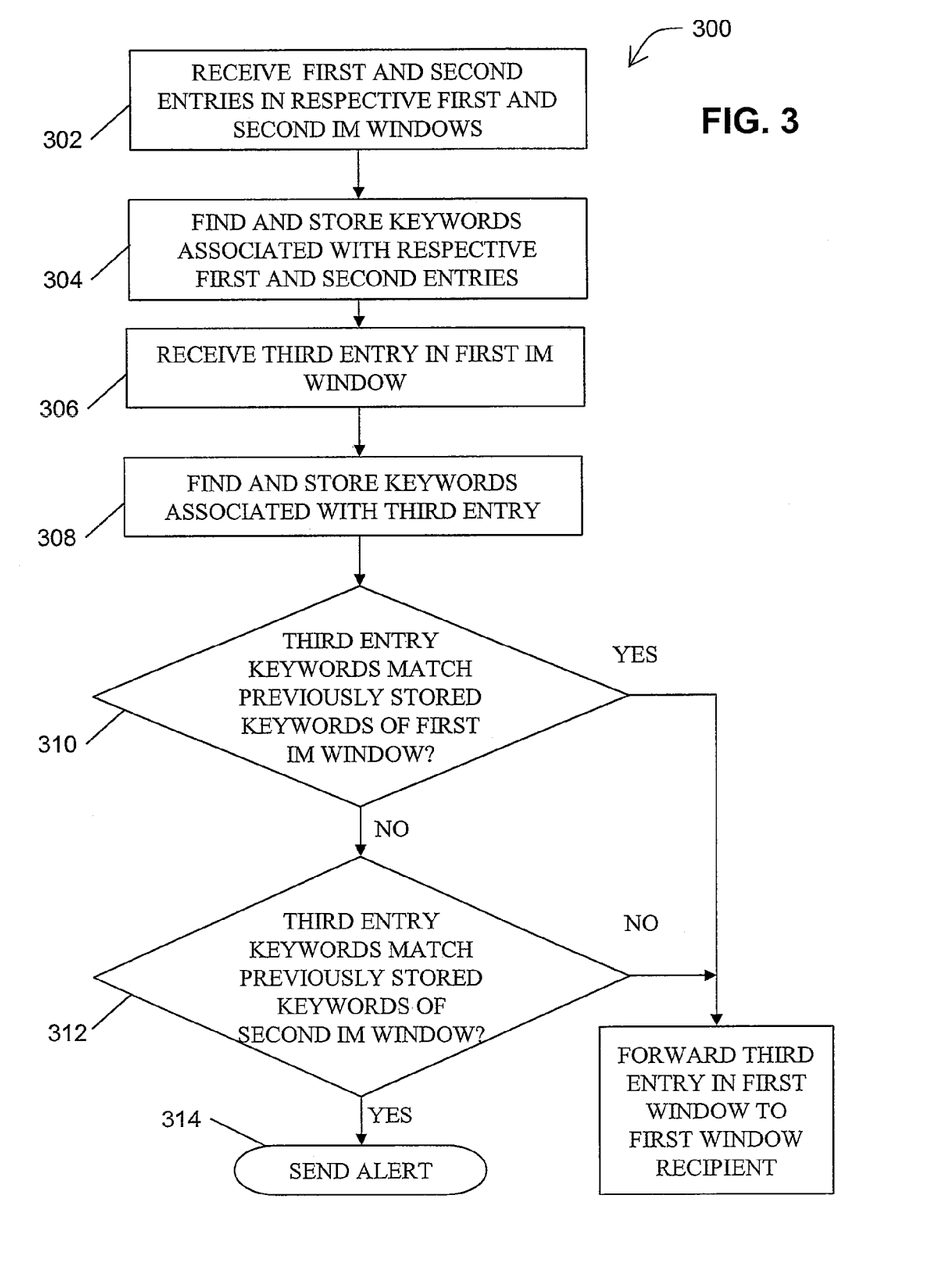
FIG. 3 is a flow chart of a process by which certain functionality of the invention can be implemented.

With reference to FIG. 3, a method 300 that can be implemented in networked computing environment 100 and data processing system 200 will be described. In one embodiment, method 300 is a keyword-based method of monitoring messages, wherein words entered in an IM window are checked for keyword matches to words previously entered in that and/or other IM windows. A thesaurus search, for example, can be used in making the keyword match determination. First and second IM windows of IM client 110 receive respective first and second entries (302). In one embodiment, KMWM 107 processes the entries to find and store keywords associated with the first and second entries (304). In some embodiments, KMWM 107 uses a thesaurus to expand the set of keywords associated with an entry. By way of example, if the entry is "I got to feed the dog," KMWM 107 expands this set of words to the set of words "got, must, have, feed, provision, serve, nourish, doggy, hound, pooch, pup," which expanded set of word is then stored for later use (304).

The first window receives a third entry (306), and KMWM 107 identifies and stores keywords associated with the third entry (308). KMWM 107 can use a thesaurus search, as previously explained above, to expand the set of keywords associated with the third entry. Next, KMWM 107 compares the keywords associated with the third entry against the previously stored keywords associated with entries in the first window (310). In one implementation, KMWM 107 uses the keywords associated with, for example, the last 10 entries in the first window. The number of previous entries that KMWM 107 uses to obtain keywords can be customized to be any number from, for example, two to one-hundred.

In response to KMWM 107 determining that the keywords in the third entry match previously stored keywords associated with the first window, IM client 110P forwards the third entry to the recipient (for example, Client A 104) associated with the first IM window, under the assumption that the keyword match indicates that the recipient associated with the first window is the actually intended recipient. In some embodiments, a predetermined comparison threshold for the keyword match is used. For example, if ten percent of the keywords associated with the third entry match keywords previously stored in association with the first IM window, KMWM 107 determines that the comparison threshold is met. The comparison threshold can be configured to be anywhere from, for example, five percent to ninety-five percent.

In response to KMWM 107 determining that the keywords associated with the third entry do not match the keywords previously stored for entries in the first window, KMWM 107 whether the keywords associated with the third entry match keywords previously stored for entries in the second window (312). In response to KMWM 107 determining that a match is not found, IM client 110P forwards the third entry to the recipient associated with the first IM window. In such a case, the third entry is assumed to be unrelated to each of the sessions in the first and second IM windows. Consequently, KMWM 107 does not issue an alert because it is assumed that the third entry is intended for the recipient associated with the first window. Thus, it is assumed that the unrelated third entry simply indicates a change in the subject of the session, for example.

In response to KMWM 107 determining that the keywords associated with the third entry match keywords previously stored for the session in the second window, KMWM 107 sends an alert (314) requesting confirmation of whether the third entry should in fact be sent to the recipient in associated with the first window. In such a case, KMWM 107 has determined that the third entry is unrelated to the session of the first window but related to the session of the second window. It is assumed that, potentially, the third entry is not intended for the recipient of the first window, but rather the third entry is actually meant for the recipient associated with the second window. To facilitate avoiding the sending of the third entry to an unintended recipient, KMWM 107 issues an alert (314). In one embodiment, KMWM 107 requests a confirmation as to whether the third entry is to be forwarded to the recipient associated with the second IM window.

Figure 4:
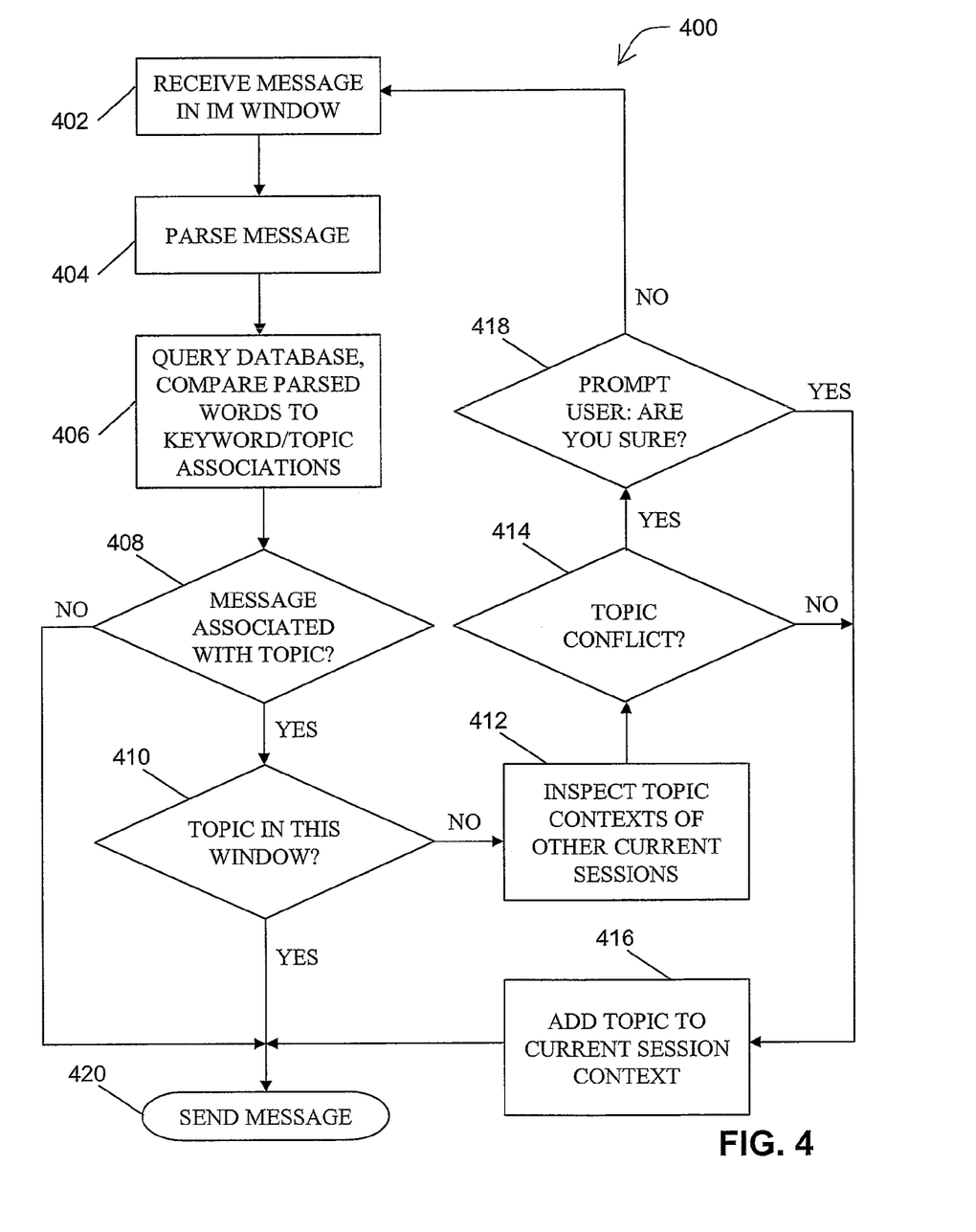
FIG. 4 is a flowchart of yet another process by which certain functionality of the invention can be implemented.

FIG. 4 illustrates a method 400 that can be used in networked computing environment 100. The method 400 involves the use of topics to monitor IM sessions and determine when to issue alerts that can facilitate preventing a message from being sent to an unintended recipient. Before going into a detailed description of specific features of method 400, general aspects of method 400 are presented to provide a convenient foundation for the detailed description of method 400.

As an IM window receives a new message in a current session, TRE 108 determines the topic of the new message from the words entered. TRE 108 also tracks the contexts (that is, grouping of topics) of the sessions in the various other IM windows currently open. If it appears that the current message contains a "topic conflict" (that is, if it seems that the topic of the message is relates more to a session different from the current session), TRE 108 engine requests a confirmation as to whether the current IM window is the correct IM window where the message should be entered. Upon receiving an indication that the current IM window is the correct window, the message is sent; however, upon receiving an indication that the current IM window is not the correct window, the message is not sent and an opportunity to modify the message or to enter the message in the correct IM window is provided. An alternative embodiment of presenting the warning is to highlight the entry as it is being entered if the topic appears to be related to a different IM window. Such an embodiment does not require an explicit disposition of a warning message.

In one embodiment, TRE 108 analyzes the IM sessions in primary client 102 and determines a topic context for each session. For instance, an IM window of primary client 102 can have a session with Client A 104 about tennis while another IM window of primary client 102 has a session with Client B 106 about politics. After a number of messages have been exchanged between the clients 102, 104, 106, TRE 108 determines the topics of each session and builds a topic context in real time. In some embodiments, TRE 108 builds a topic index by recognizing keywords used in the messages and comparing the keywords against keyword or topic database 112.

Database 112 can be a component hosted on a central server. Such a configuration can be useful in situations where, for example, there are topics that have a time sensitive nature, such as corporate projects and products. A code-name given to a new product that otherwise would have been assigned to a topic unrelated to the new product may need to be associated with a new topic about the new product. By hosting database 112 on a central server, topics and keywords can be kept up to date, relevant, and made automatically available to all clients. In another embodiment, database 112 can be hosted or stored within, for example, the data processing system 200.

Figure 5:
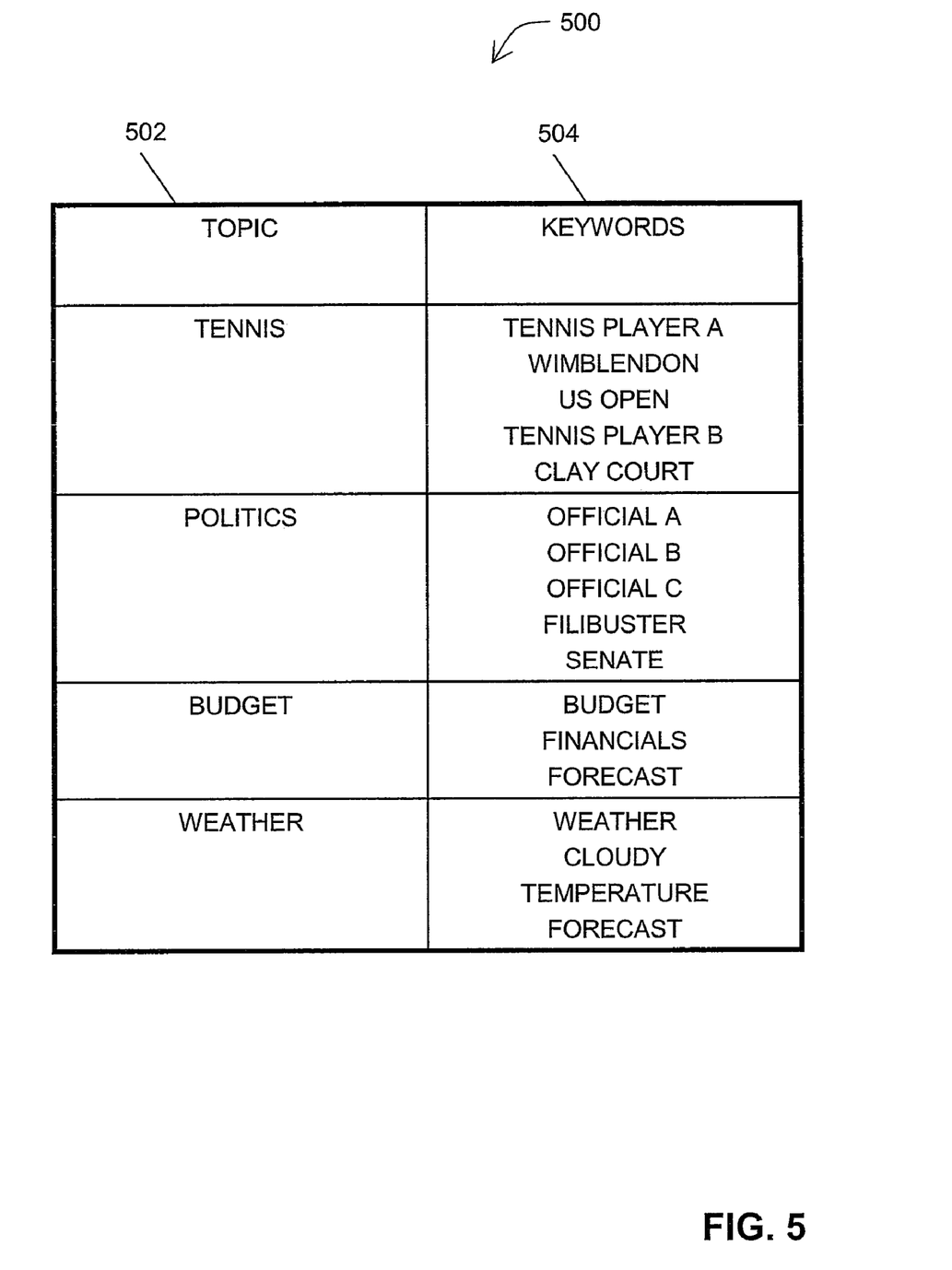
FIG. 5 is a schematic illustration of a data structure that can be used with the process of FIG. 4.

With reference to FIG. 5, in one embodiment, database 112 includes a table 500 that maps topics 502 to associated keywords 504. When an IM window receives a message to be forwarded to the recipient associated with the IM window, TRE 108 determines the topic by matching the keywords used in the message against the keywords in table 500. Note that some keywords may be associated with multiple topics, as in the case of FORECAST which can be associated with both the BUDGET and the WEATHER topics.

TRE 108 can be configured to parse an IM session as a message is entered, and to capture keywords used in the session that are also stored in database 112. For example, entering the name of a well-known tennis player triggers the TENNIS topic. An IM session may have many topics within its context.

Figure 6:
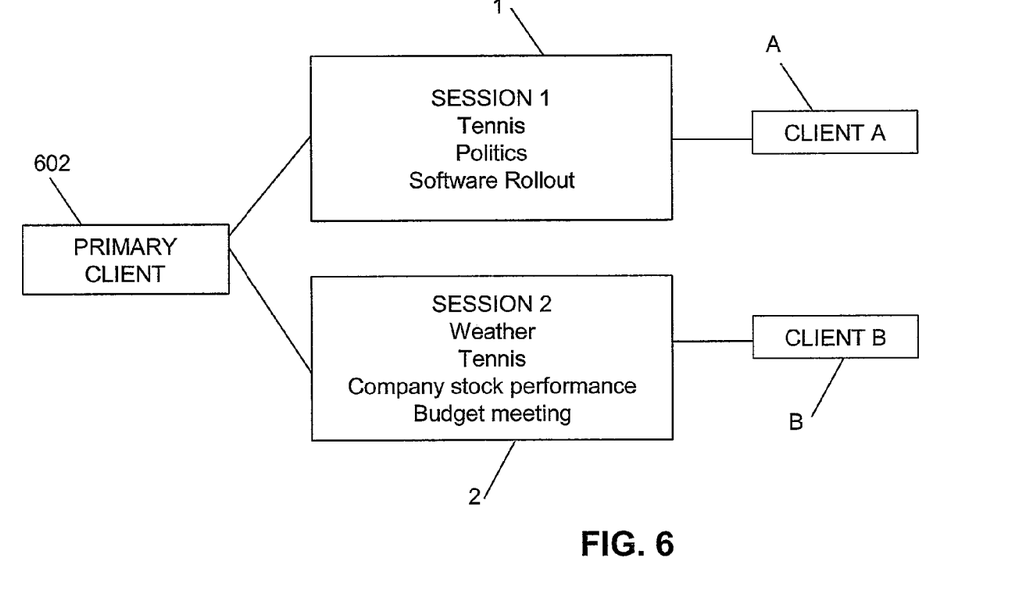
FIG. 6 is block diagram depicting an exemplary typed-text-based communication between multiple parties, which communication is structured and processed to support certain functionality of the invention.

Referencing FIG. 6, by way of example, primary client 602 supports simultaneously session 1 and session 2 with Client A and Client B, respectively. Each of sessions 1 and 2 contains multiple topics. In this scenario, primary client 602 has a session with Client A on any given topic, but if primary client 602 attempts to send a message to Client A (session 1) containing keywords associated with a topic in session 2, primary client 602 is prompted for confirmation. It might be the case that primary client 602 has respective sessions with Client A and Client B in which the topic is the same for both sessions. In this case, the topic appears in both contexts, as can be seen by the example of the topic TENNIS appearing in both session 1 and session 2. As long as primary client 602 does not shift to a topic in session 1 that matches a topic in session 2, a warning is not issued. In the above example, if primary client starts a session with Client A about something completely different (say, LUNCHEON) no warning is issued. But if primary client 602 starts a session with Client A about the topic BUDGET, an alert is issued because primary client 602 has a session about the topic BUDGET with Client B in session 2.

Returning now to FIG. 4, a first IM window receives a message (402). TRE 108 parses the message to identify keywords (404). TRE 108 checks the keywords against table 500, for example, and TRE 108 determines whether the keywords match one or more topics (406, 408). In response to TRE 108 determining that there are no matches, IM client 110 immediately sends the message to the recipient associated with the first IM window (420). In response to TRE 108 determining that there is at least one keyword match, TRE 108 identifies a topic (408). For instance, if TRE 108 finds that the keyword WIMBLEDON is a match, TRE 108 identifies the topic as TENNIS (see FIG. 5). TRE 108 can also be configured to determine if the topic is already in the context of the current session (410). In response to TRE 108 determining that the topic is already in the context of the current session, the IM client 110 sends the message to the recipient associated with the IM window (420). In response to TRE 108 determining that the topic is not already in the context of the current session, TRE 108 analyzes the topic contexts of other IM windows currently open (412). For example, TRE 108 checks the context of the session between primary client 602 and Client B.

A topic conflict occurs when another session has the current topic in its context. This is the case, for example, where primary client 602 currently includes a session about TENNIS in session 2 with Client B. Next, TRE 108 determines if a topic conflict exits (414). In response to TRE 108 determining that there is no topic conflict, TRE 108 adds the current topic (416), that is, TENNIS, to the current session context with client A. In response to TRE 108 determining that there is a topic conflict, TRE 108 alerts primary client 602 and prompts primary client 602 for confirmation (418). Primary client 602 may choose to send the message despite the topic conflict (416, 420), which results in TRE 108 adding the topic to the current context (that is, primary client 602 now includes a session about TENNIS with both Client A and Client B), or primary client 602 may cancel the forwarding of the message so that the message or the recipient can be changed (402).

With the method 400 a session topic context can be built in real time. Every time primary client 602 starts a session with Client A or Client B, TRE 108 creates a new session context. In another embodiment, primary client 602 allows pre-selection of the topic or topics that will be the subject of an IM session with Client A, for example. In this scenario, primary client 602 allows selection of the topic MOVIES, for example, to use as the main topic for a session with Client A. The topic MOVIES can be associated with a predetermined list of keywords. Primary client 602 can allow configuration of the keyword list. If an attempt is made to send a message to Client B which includes a keyword from the topic MOVIES, TRE 108 provides a notification in the primary client 602 prior to IM client 110 sending the message.

In some embodiments, TRE 108 can use criteria other than context matching to determine the scope of a session. For instance, the criteria can include message length. Technical discussions tend to consist of relatively long, multi-word messages. In contrast, casual conversations often involve short, one or two word, responses. Language formality or correctness can be another criterion. Some sessions require the use of formal language. If a session involves a company president, for example, the session might require the use proper punctuation and spelling at all times. Sessions involving casual conversations, in contrast, tend to include fragmented sentences and colloquial terms like "nope" and "FYI". Of course, these criteria can be used singly or in combination with other criteria. In another embodiment, if the IM client 110 is integrated with an email application (not shown), an email history can be used to build the context prior to, or supplementing, any context creation during an IM session.

In the flow charts and/or functional block diagrams above, one or more of the methods can be embodied in a computer writable and/or readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware, or hardware. As a preparatory step to practicing the invention in software, the programming code (whether software or firmware) will typically be stored in one or more machine readable and writable storage media such as fixed (hard) drives, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been described with reference to exemplary embodiments, it will be understood by those skilled in the relevant technology that various changes may be made and equivalents may be substituted for elements thereof without departing from the scope of the invention. In addition, many modifications may be made to adapt a particular system, device, or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of monitoring messages in a communications network to avoid the sending of a message to an unintended recipient, the method comprising:
  receiving a first entry in a first instant messaging (IM) window on a communication device, identifying first keywords associated with the first entry, and storing the first keywords;
  receiving a second entry in the first IM window, identifying second keywords in the second entry, and storing the second keywords;
  determining via a keyword match and warning module (KMWM) whether the first keywords meet a first predetermined comparison threshold when compared to the second keywords; and
  issuing a warning via the KMWM in response to determining that the first comparison threshold is not met.

2. The method of claim 1, wherein issuing a warning comprises requesting a confirmation that the second entry should be sent to the recipient associated with the first IM window.

3. The method of claim 1, further comprising:
  receiving third keywords in a second IM window;
  determining whether the second keywords meet a second predetermined comparison threshold against the third keywords; and
  issuing a confirmation request as to whether the second entry should be sent in response to determining the second comparison threshold is met.

4. A method of monitoring messages in a communications network to avoid sending a message to an unintended recipient, the method comprising:
  a data processing system identifying, via a topic recognition engine, topics associated with respective first and second instant messaging (IM) sessions;
  the data processing system determining whether a first message in the first IM session is associated with a first pre-defined topic, whether the first pre-defined topic matches a topic identified as being associated with the first IM session, and whether the first pre-defined topic matches a topic identified as being associated with the second IM session; and
  in response to determining that the first message is associated with the first pre-defined topic and that the first-predefined topic matches a topic identified as being associated with the second IM session, the data processing system issuing a confirmation request as to whether the first message should be sent to a recipient associated with the first IM session.

5. The method of claim 4, further comprising, in response to determining that the first message is not associated with a first pre-defined topic, sending the first message to the recipient associated with the first IM session.

6. The method of claim 4, further comprising, in response to determining that the first pre-defined topic matches a topic identified as associated with the first IM session, sending the first message to the recipient associated with the first IM session.

7. The method of claim 4, further comprising, in response to determining that the first pre-defined topic does not match a topic identified as being associated with the second IM session, associating the first pre-defined topic with the first IM session.

8. The method of claim 7, further comprising sending the first message to the recipient associated with the first IM session.

9. The method of claim 4, wherein determining whether the first message is associated with a first pre-defined topic comprises parsing the first message to identify keywords.

10. The method of claim 9, wherein determining whether the first message is associated with a first pre-defined topic comprises querying a database to map the identified keywords to a topic.

11. A system for monitoring messages in a communication to avoid sending a message to an unintended recipient, the system comprising:
  an instant messaging (IM) module in a communication device, the IM module configured to process first and second entries in a first IM window; and
  a keyword match and warning module (KMWM) configured to:
    identify first and second keywords associated respectively with the first and second entries;
    determine whether the first keywords meet a first predetermined comparison threshold when compared to the second keywords; and
    issue a warning in response to a determination that the first comparison threshold is not met.

12. The system of claim 11, wherein the KMWM is further configured to request a confirmation that the second entry should be sent to a recipient associated with the first IM window.

13. The system of claim 11, further comprising:
  wherein the IM module is further configured to receive third keywords in a second IM window; and
  wherein the KMWM is further configured to:
    determine whether the second keywords meet a second predetermined comparison threshold when compared to the third keywords; and
    issue a confirmation request as to whether the second entry should be sent when the second comparison threshold is met.

14. A data processing system for monitoring messages in a communications network to avoid sending a message to an unintended recipient, the data processing system comprising:
  a processor;
  data storage coupled to the processor; and
  program code stored within the data storage that, when executed by the processor, causes the data processing system to:
    identify topics associated with first and second IM sessions;
    determine whether a first message in the first IM session is associated with a first pre-defined topic, whether the first pre-defined topic matches a topic identified as being associated with the first IM session, and whether the first pre-defined topic matches a topic identified as being associated with the second IM session; and in response to a determination that the first message is associated with the first pre-defined topic and that the first-predefined topic matches a topic identified as being associated with the second IM session, issue a confirmation request as to whether the first message should be sent to a recipient associated with the first IM session.

15. The data processing system of claim 14, wherein the program code, when executed, further causes the data processing system to:

in response to determining that the first message is not associated with a first pre-defined topic, send the first message to the recipient associated with the first IM session.

16. The data processing system of claim 14, wherein the program code, when executed, further causes the data processing system to:

in response to a determination that the first pre-defined topic matches a topic identified as being associated with the first IM session, send the first message to the recipient associated with the first IM session.

17. The method of claim 14, wherein the program code, when executed, further causes the data processing system to:

in response to a determination that the first pre-defined topic does not match a topic identified as being associated with the second IM session, associate the first pre-defined topic with the first IM session.

18. A computer program product, comprising:

a tangible computer readable storage medium; and program code stored within the tangible computer readable storage medium, that when executed by a data processing system, enables the data processing system to perform:

identifying first and second topics associated with respective first and second instant messaging (IM) sessions;

determining whether a first message in the first IM session is associated with a first pre-defined topic, whether the first pre-defined topic matches a topic identified as being associated with the first IM session, and whether the first pre-defined topic matches a topic identified as being associated with the second IM session; and in response to determining that the first message is associated with the first pre-defined topic and that the first-predefined topic matches a topic identified as being associated with the second IM session, issuing a confirmation request as to whether the first message should be sent to a recipient associated with the first IM session.

19. The computer program product of claim 18, wherein the program code further enables the data processing system to perform:

in response to determining that the first message is not associated with a first pre-defined topic, sending the first message to a recipient associated with the first IM session.

20. The computer program product of claim 18, wherein the program code further enables the data processing system to perform:

in response to determining that the first pre-defined topic matches a topic identified as being associated with the first IM session, sending the first message to a recipient associated with the first IM session.

* * * * *